United States Patent
Wang et al.

(10) Patent No.: US 8,595,176 B2
(45) Date of Patent: Nov. 26, 2013

(54) SYSTEM AND METHOD FOR NETWORK SECURITY EVENT MODELING AND PREDICTION

(75) Inventors: Haiqin Wang, Sammamish, WA (US); Jai Choi, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 884 days.

(21) Appl. No.: 12/639,182

(22) Filed: Dec. 16, 2009

(65) Prior Publication Data

US 2011/0145185 A1    Jun. 16, 2011

(51) Int. Cl.
*G06F 17/00*    (2006.01)
(52) U.S. Cl.
USPC ............................................................ 706/52
(58) Field of Classification Search
USPC ........................................... 706/52; 702/188
See application file for complete search history.

(56) References Cited

U.S. PATENT DOCUMENTS

| | | | |
|---|---|---|---|
| 5,278,901 A | 1/1994 | Shieh et al. | |
| 5,414,833 A | 5/1995 | Hershey et al. | |
| 6,907,430 B2 | 6/2005 | Chong et al. | |
| 7,447,666 B2 | 11/2008 | Wang | |
| 7,607,169 B1* | 10/2009 | Njemanze et al. | 726/22 |
| 2004/0024773 A1* | 2/2004 | Stoffel et al. | 707/102 |
| 2005/0251860 A1 | 11/2005 | Saurabh et al. | |
| 2007/0094219 A1* | 4/2007 | Kipersztok | 706/52 |
| 2007/0219754 A1* | 9/2007 | D'Ambrosio | 702/188 |
| 2009/0205015 A1* | 8/2009 | Baliosian et al. | 726/1 |

OTHER PUBLICATIONS

Mannila, et al., Discovery of Frequent Episodes in Event Sequences, Data Mining and Knowledge Discovery 1, (1997) 259-289, Kluwer Academic Publishers, The Netherlands.
Wang, et al., Discovering Time-Constrained Patterns from Long Sequences, Studies in Computational Intelligence in Industrial Systems, ISBN: 978-3-540-782960-4, 2008, pp. 99-115, Springer-Verlag Berlin Heidelberg.

* cited by examiner

*Primary Examiner* — Jeffrey A Gaffin
*Assistant Examiner* — Ola Olude Afolabi
(74) *Attorney, Agent, or Firm* — McNees Wallace & Nurick LLC (57) ABSTRACT

A security tool is disclosed for predicting a sequence of events based on the current events observed. The security tool relies on sequential event mining algorithms to discover the baseline event patterns, from which a prediction can be performed. The security tool translates the sequential patterns into a Dynamic Bayesian Network prediction model. A temporal reasoning engine then feeds the model with the current event status and predicts what events are likely to happen in next time window, and with what probability.

13 Claims, 6 Drawing Sheets

- Probability of Event A Occurring $\quad p(A) = \dfrac{\#A}{n} = O_{sup}$

- Probability of Event A Occurring when Event B Occurs $\quad p(A\backslash B) = \dfrac{\#AB}{\#B} = O_{cov}$

- Probability of Event B Occurring when Event A Occurs $\quad p(B\backslash A) = \dfrac{\#AB}{\#A} = O_{conf}$

- Probability of Event B Occurring when Event A Does not Occur $$p(B\backslash \bar{A}) = \dfrac{\#B\bar{A}}{\#\bar{A}} = \dfrac{\#B - \#AB}{n - \#A} = \dfrac{\dfrac{\#B}{n} - \dfrac{\#AB}{n}}{1 - \dfrac{\#A}{n}} = \dfrac{p(B) - O_{conf} \cdot O_{sup}}{1 - p(A)}$$

FIG. 4

|   | A=0 | A=1 |
|---|---|---|
|   | 0.1 | 0.9 |

| $A_t$ | A=0 | A=1 |
|---|---|---|
| 0 | 0.1 | 0.9 |
| 1 | 0.7 | 0.3 |

| A | B=0 | B=1 |
|---|---|---|
| 0 | 0.1 | 0.9 |
| 1 | 0.7 | 0.3 |

| A | $A_t$ | B=0 | D=1 |
|---|---|---|---|
| 0 | 0 | 0.1 | 0.9 |
| 0 | 1 | 0.7 | 0.3 |
| 1 | 0 | 0.8 | 0.2 |
| 1 | 1 | 0.9 | 0.1 |

| Events | Probabilities | |
|---|---|---|
| W2kFailedAccessUnauthorizedAccess | 83.0% | |
| BiHttpUrlNameVeryLong | 78.0% | |
| UnxFileTamperingFileReplacedChanged | 70.7% | |
| BiSnmpSet | 70.7% | |
| BiSnmpDefaultBackdoor | 70.7% | |
| DcerpcMessageSpammingAttempted | 70.7% | |
| BiTcpPortScan | 63.0% | |
| BiHtmlNullCharEvasion | 52.0% | |
| SnmpOctetStringFieldLengthZero | 48.0% | |
| IcmpTracerouteEchoRequestPacket | 25.0% | |
| BiEchoReplyWithoutRequest | 23.0% | |

FIG. 7

SYSTEM AND METHOD FOR NETWORK SECURITY EVENT MODELING AND PREDICTION

FIELD

This disclosure relates generally to data network management. More particularly, the disclosure relates to a system and method for analyzing network event data and predicting a next event sequence.

BACKGROUND

Computer networks and systems have become indispensable tools for modern business. Today, terabits of information are stored in and accessed across such networks by users throughout the world. Much of this information is, to some degree, confidential and its protection is required. Not surprisingly then, intrusion detection systems (IDS) have been developed to help uncover attempts by unauthorized persons and/or devices to gain access to computer networks and the information stored therein. There is a need for an improved IDS tool for predicting cyber security attacks.

SUMMARY

The following embodiments and aspects thereof are described and illustrated in conjunction with systems and methods that are meant to be exemplary and illustrative, not limiting in scope. In various embodiments, one or more of the limitations described above in the Background have been reduced or eliminated, while other embodiments are directed to other improvements.

A first embodiment of the disclosure includes a method for predicting a sequence of events. The method includes a computer programmed product embodied on a computer readable medium and configured to be executed by a microprocessor. The computer programmed product includes a method for predicting a sequence of events by computer instructions including collecting baseline event patterns, searching the baseline event patterns for sequential patterns, translating the sequential patterns into a probabilistic graphical model; and using a temporal reasoning engine to feed the probabilistic graphical model with current events and predict future events and the probability the future events will happen in a next time window.

A second embodiment of the disclosure includes a computer program product embodied on a computer readable medium and configured to execute by a microprocessor, the computer program product comprising a method for predicting a sequence of events by computer instructions including collecting baseline event patterns, searching the baseline event patterns for sequential patterns; translating the sequential patterns into a probabilistic graphical model; and using a temporal reasoning engine to feed the probabilistic graphical model with current events and predict future events and the probability the future events will happen in a next time window.

One advantage of the present disclosure is to provide a system and method to anticipate cyber security attacks through the predicted events.

Another advantage of the present disclosure is to improve cyber security readiness.

Another advantage of the present disclosure is to reduce the cost of cyber security management.

Further aspects of the method and apparatus are disclosed herein. Other features and advantages of the present disclosure will be apparent from the following more detailed description of the preferred embodiment, taken in conjunction with the accompanying drawings that illustrate, by way of example, the principles of the disclosure.

DETAILED DESCRIPTION

The present disclosure now will be described more fully hereinafter with reference to the accompanying drawing, in which a preferred embodiment of the disclosure is shown. This disclosure may, however, be embodied in many different forms and should not be construed as limited to the embodiments set forth herein; rather, these embodiments are provided so that this disclosure will be thorough and complete and will fully convey the scope of the disclosure to those skilled in the art.

The present disclosure provides a network security system and method, hereinafter referred to as "security tool", to effectively analyze network event data and predict the next event sequence. The network event data may be buried inside a large volume of network traffic data and alerts generated by event capturing mechanism such as Intrusion Detection System output. The security tool predicts network events based on temporal patterns discovered by a data mining technique. The security tool translates the temporal patterns into a probabilistic graphical model, for reasoning based on the temporal event dependencies. The event patterns and the dependency models are updated periodically to reflect the variation and evolution of the security events over time. In one embodiment, the probabilistic graphical model is a Dynamic Bayesian Network (DBN).

The security tool then automatically constructs a temporal reasoning model or models from the sequential patterns for prediction of cyber network security events and calculates their posterior probabilities.

In one embodiment, the security tool predicts a sequence of events based on the set of observed event. The security tool relies on sequential event mining algorithms to discover the baseline event patterns, from which a prediction can be performed. The security tool translates the sequential patterns into a Dynamic Bayesian Network prediction model. A temporal reasoning engine then feeds the model with the current event and performs prediction and outputs set of predicted events and likelihood probabilities.

Figure 1:
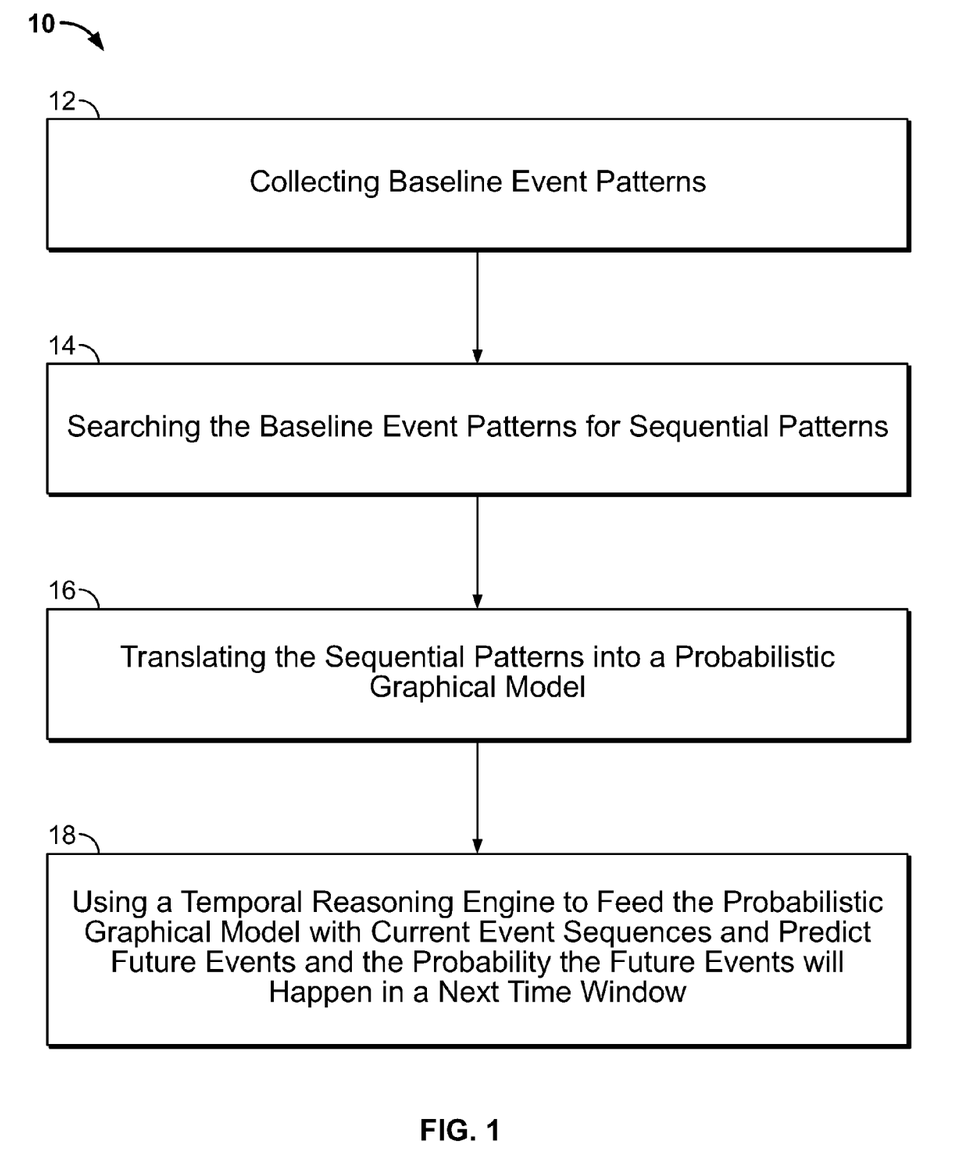
FIG. 1 illustrates an exemplary method according to the disclosure.

In one embodiment illustrated in FIG. 1, the security tool 10 includes a computer programmed product embodied on a computer readable medium and configured to be executed by a microprocessor. The computer programmed product includes a method for predicting a sequence of events including computer instructions for collecting baseline event patterns 12, searching the baseline event patterns for sequential patterns 14, translating the sequential patterns into a probabilistic graphical model 16, and feed the probabilistic graphical model with current event sequences to predict future events and their probability in a next time window 18. Only non-transitory computer-readable media are within the scope of the disclosure. For the purpose of the disclosure, non-transitory computer-readable media are intended to encompass all computer-readable media except for a transitory, propagating signal or carrier waves.

Figure 2:
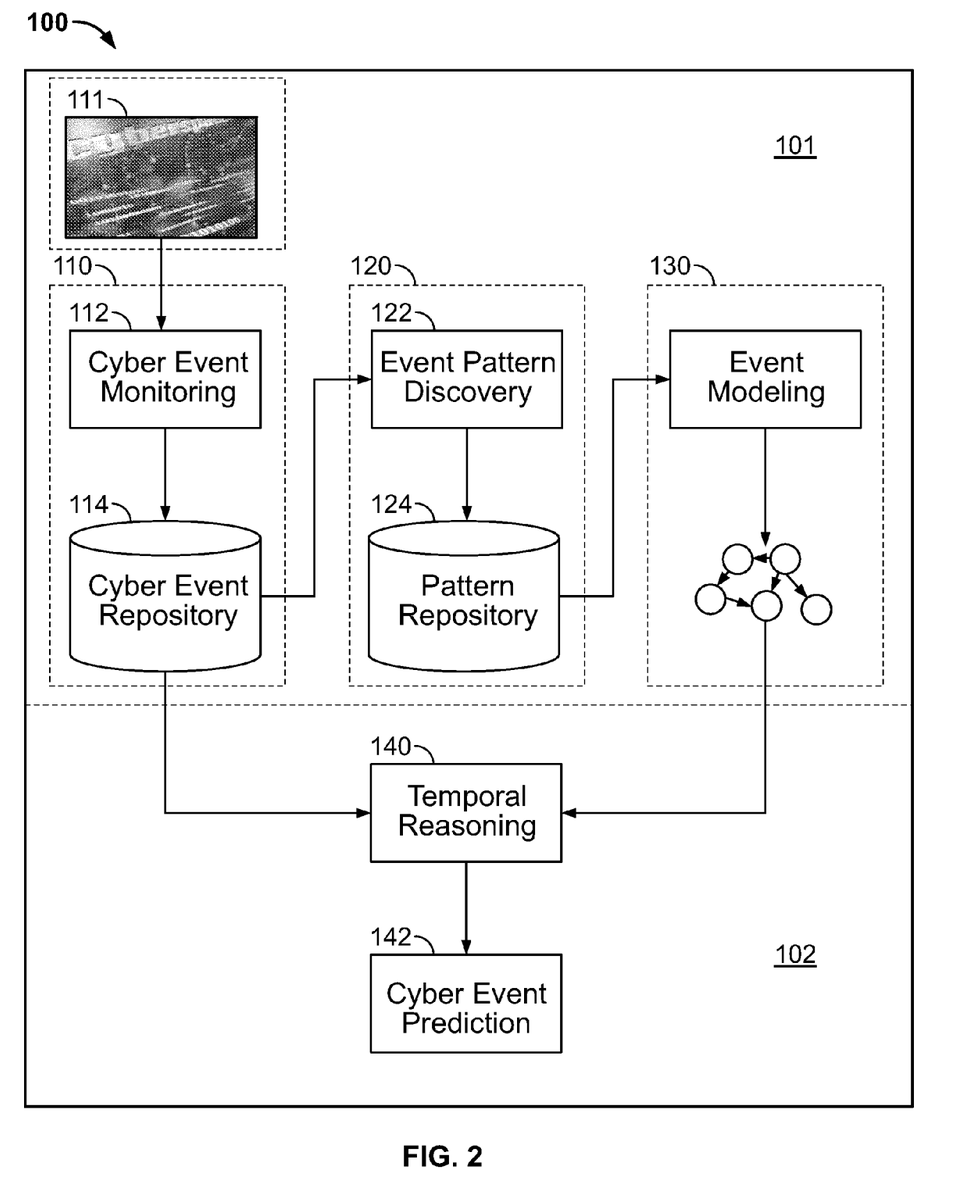
FIG. 2 shows a block diagram of an embodiment of a security tool according to the disclosure

FIG. 2 is a flow chart of an embodiment of a security tool 100 according to the disclosure. As can be seen in FIG. 1, the security tool 100 includes an event monitoring and modeling (M&M) component 101 and an event prediction component 102. The event M&M component 101 includes a first component or monitoring system 110 that includes a monitoring component 112 and an event repository 114. The monitoring component 112 collects network security events from a computer network 111 and logs the collected network security events to the cyber event repository 114 for storage in an event database. In one embodiment, the monitoring component 112 may consist of multiple distributed tools. In one embodiment, the monitoring component 112 may include open source network intrusion detection and prevention system (IDS/IPS) software that includes signature inspection. For example, the monitoring component 112 may include Snort®, an open source network intrusion detection system (IDS) developed by Sourcefire® of Columbia, Md., USA. In another example, the monitoring component may include RealSecure® by Internet Security Systems®. The event repository 114 may be a suitable readable memory device, for example, a hard drive.

The event M&M component 101 further includes a second component or an event pattern discovery system 120. The event pattern discovery system 120 includes an event pattern discovery component 122 and a pattern repository 124. The event pattern discovery component 122 searches the cyber event repository 114 to discover sequential patterns. The event pattern discovery component provides the sequential patterns to the pattern repository 124 for storage. In one embodiment, the event pattern discovery component 122 automatically searches the cyber event repository 114 to discover the sequential patterns. In one embodiment, the event pattern discovery component 122 automatically searches the cyber event repository 114 to discover the sequential patterns. In another embodiment, the event pattern discovery component searches the cyber event repository upon activation of a trigger such as a command input by an operator.

In one embodiment, the event pattern discovery component 122 includes a sequential pattern miner (SPM) that can efficiently discover the patterns. In one embodiment, the event pattern discovery component 122 may include time constraints that specify a time window for the event sequence search. For example, two events can be considered as a sequence if they occur within a five minute time window. The event pattern discovery component may include other attributes such as IP address, or port numbers can also be used during the search.

The event M&M component 101 further includes a third component or an event modeling system 130. The event modeling system 130 translates the sequential event patterns into a Dynamic Bayesian Network (DBN) model. In the DBN model, a pattern {AB} introduces two nodes A and B, and an arc between A and B, noted as A->B. The arc may be temporal or parallel. Whether the arc is a temporal arc between two different windows depends on whether the pattern is parallel or serial. A parallel pattern is translated into a normal arc between the two nodes within the same time slice of the DBN model. A serial pattern is translated into a temporal arc between the two nodes in different time slices of the DBN model. The conditional probabilities are derived from the statistic metrics of the pattern.

The event prediction component 102 includes a first component or a temporal reasoning component 140 and a second component or a cyber event prediction component 142. The temporal reasoning component 140 takes the events observed in the current time window as evidence to set the states of the corresponding nodes in the DBN model, and updates the posterior beliefs of the events in the model. The updated belief tells how likely the probable events will happen for the next time window, given the current observation. The cyber event prediction component 142 reads the inference output from the temporal reasoning component 140 and displays the ranking among predicted events, ordered by their posterior probabilities. The prediction result is presented in Hypertext Markup Language (HTML) format on a web server and displayed on a monitor so that the security analysts can observe it anywhere from the Internet.

In an exemplary embodiment that will now be described, a security tool is disclosed that translates sequential patterns into DBN models for event prediction. In this exemplary embodiment, a two-event pattern (meaning that the sequence consists of two events) is used. In another embodiment, multiple event patterns may be used.

Temporal data mining is used to generate a sequence or a list of events ordered by their time stamps of occurrence. For example, a network event log can be treated as a single sequence that contains all the events to be examined. When mining the frequent patterns from an event sequence, usually the events in a pattern must occur close in time. Therefore, executing the mining algorithms requires some form of time constraints. One of such time constraints is the width of time window that the pattern must occur. Without loss of generality, a time unit is used to describe the time span between two events. For any two events that form a sequential pattern, the order of occurrence can be either parallel or serial. In a parallel pattern AB shown in FIG. 3A, event A and event B can occur in either order. In a serial pattern A->B shown in FIG. 3B, event A occurs first and is followed by event B within the time span (e.g., two time units).

Figure 3A:
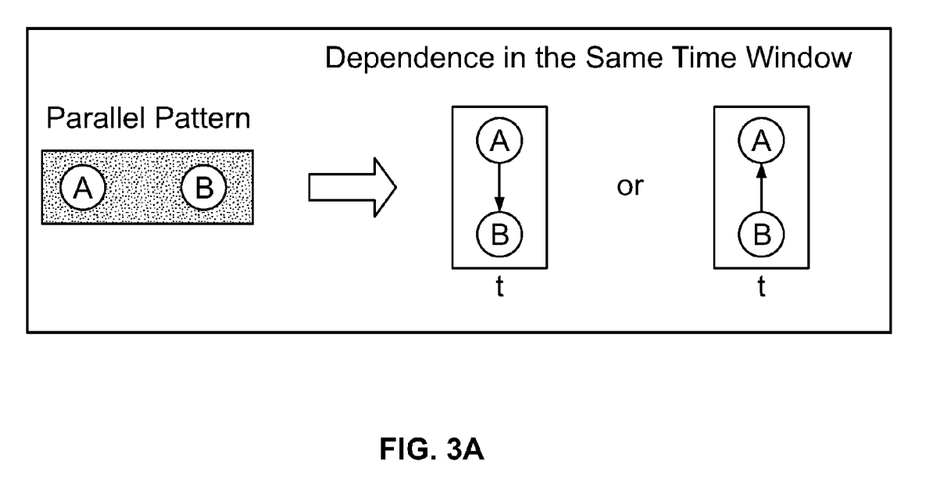
FIG. 3A shows an example of a parallel pattern AB according to the disclosure.
Figure 3B:
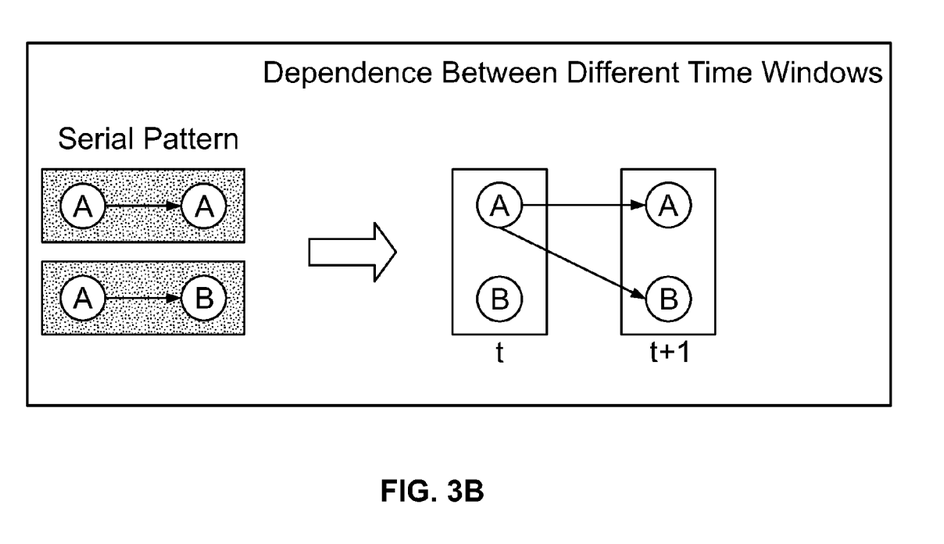
FIG. 3B shows an example of a serial pattern AB according to the disclosure.

The patterns are translated into DBN models for cyber event prediction. In DBN, each event is represented as a node, and a pattern between AB can be represented as a directed arc A->B. For two events AB that exhibit a parallel pattern, a normal directed arc is added between the nodes, as shown in FIG. 3A. For two events AB that exhibit a serial pattern, a temporal arc is added between the two nodes in the Bayesian networks for the corresponding different time slices, as shown in FIG. 3B.

The patterns in the pattern repository are translated to build the DBN model's graphical structure. A new event node is added into the DBN model when it is seen for the first time in a pattern. A new arc is added into the DBN model to describe the new dependency relationship that the pattern represents, subject to the condition that such addition of the arcs does not create a cycle in the DBN graph.

When a pattern contains more than two events, there exists conditional dependency relationship among more than two nodes. There are three possible types of graphical structure of adjacent triplets allowed in a Directed Acyclic Graph (DAG).
1) A->B->C
2) A<-B->C
3) A->B<-C The first two are actually equivalent and represent the same dependencies (the event A and C are independent given B). The third type identifies a unique dependency relationship. That is, A and C are marginally independent, and all other pairs are dependent. For a typical dependency of three event pattern ABC, which means event A is followed by event B and then event C, type 1 is used in DBN graphical structure. Similarly, a three-event pattern B{AC}, which means that pattern AC only exist when event B happens, is represented by type 2 structure above. But a pattern {AC}B, which means that event B only occurs when both A and C happen, is translated into type 3 structure.

Once DBN structure is created, the next step is to quantify the DBN with probability parameters; these include prior probability parameters for the nodes that do not have any incident arc, and conditional probability parameters for the nodes that have incident arcs.

The DBN probability parameters are then translated. Each node in the DBN models represents an event and has two states, occurring and not occurring. The prior probability of any event A and the conditional probability of event B given A can be deduced from statistical metrics of the corresponding sequential patterns.

Each sequential pattern is associated with a set of statistical metrics. Specifically, there are a few statistical metrics that are useful in translating patterns into DBN probability parameters. Depending upon the outcome of the mining algorithms used for pattern discovery, the frequency-based statistics can be calculated to reflect the statistics used for quantifying the DBN models.

The statistic metrics may include:

1) Pattern support: defines the prior probability of the pattern's antecedent event. The support of a pattern AB equals to the ratio of event A's frequency (denoted as #A), to the total number of events in the sequence (denoted as n), where $Osup = \#A/n$ 2) Pattern confidence: defines the conditional probability of the co-occurrence of events A and B, given that antecedent event A is observed. The confidence of a pattern AB equals to the ratio of the co-occurrence frequency of A and B (denoted as #AB), to the frequency of A (denoted as #A), where $Oconf = \#AB/\#A$ 3) Pattern coverage: defines the conditional probability of the co-occurrence of events A and B, given that the consequence event's occurrence. The coverage of a pattern AB equals to the ratio of the co-occurrence frequency of A and B (denoted as #AB), to the frequency of B (denoted as #B), where $Ocov = \#AB/\#B$.

Figure 4:
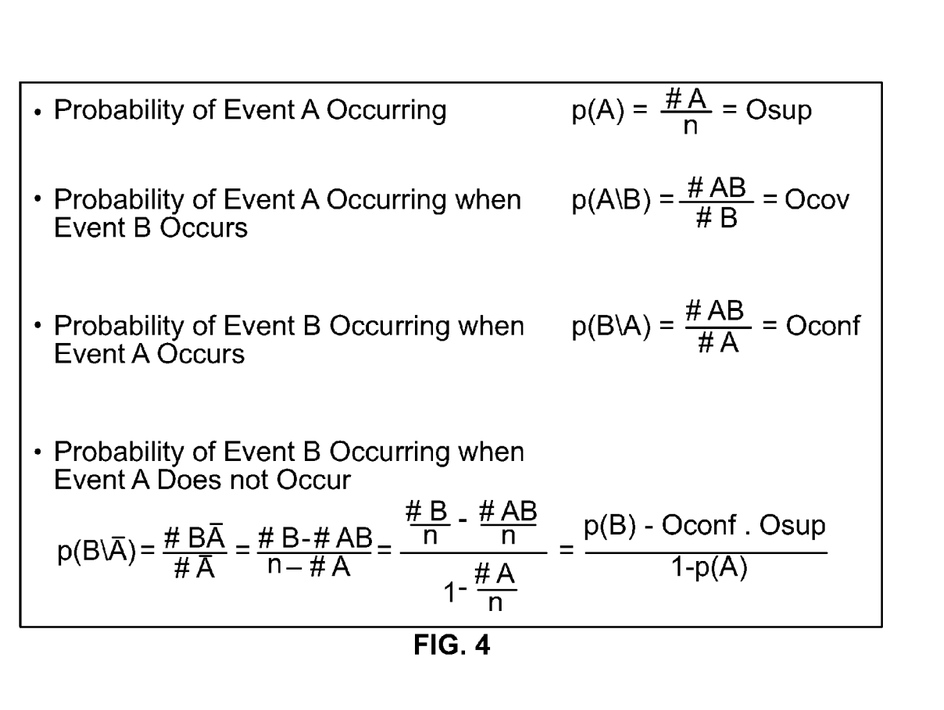
FIG. 4 illustrates a set of probability parameters for DBN (Dynamic Bayesian Network) according to the disclosure.

The probabilistic interpretation of the sequential pattern metrics makes it straightforward to translate the statistical characteristic of a pattern into its corresponding DBN probability parameters. FIG. 4 summarizes the translation of probability parameters.

Figure 5:
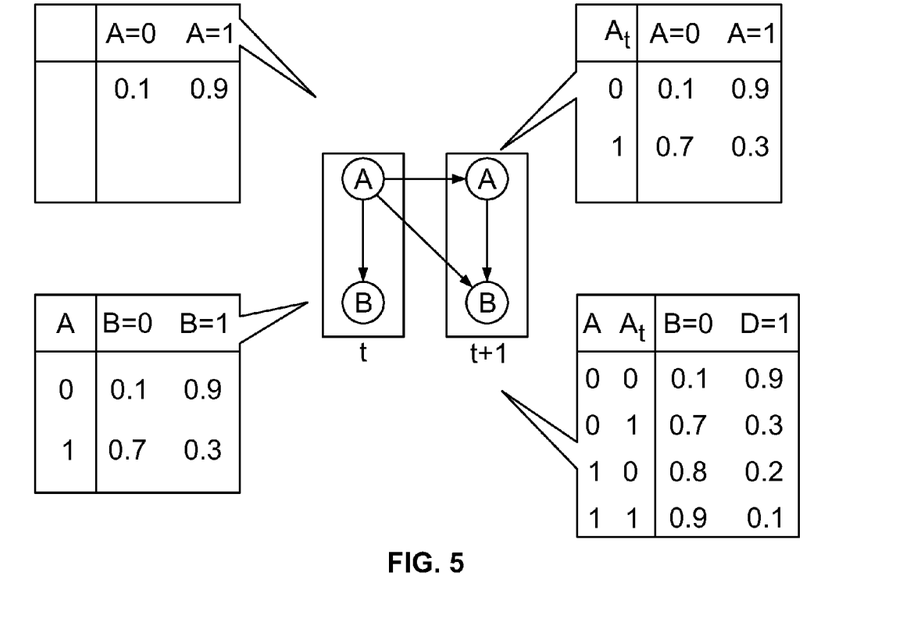
FIG. 5 illustrates a DBN translated from the two-event patterns shown in FIGS. 3A and 3B.

With both graphical structure and probability parameters, a DBN model is complete and ready to use for reasoning. An example of a DBN model translated from a two-event pattern of FIGS. 3A and 3B and is shown in FIG. 5, where the graph represents the structure of the DBN, and the tables show the probability parameters of the DBN.

Figure 6:
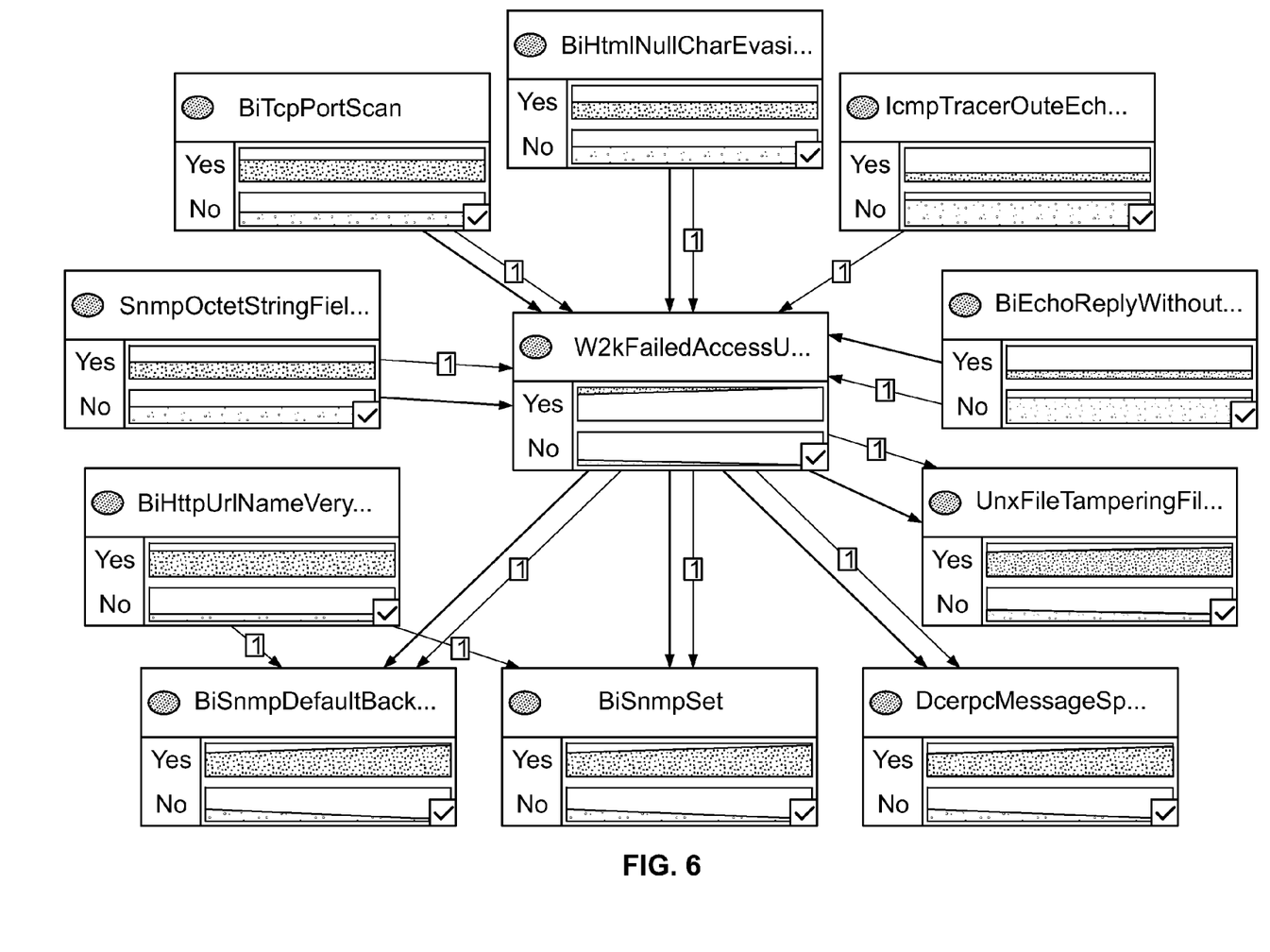
FIG. 6 illustrates an exemplary DBN model built from sequential event patterns.

FIG. 6 shows a DBN model built from some sequential event patterns that are related to a W21FailedAccessUnauthorizedAcess event. Note that this model represents the dependencies of cyber events in two time windows. Arcs marked with number 1 indicate that the dependency relationship between the arc's source node and the arc's destination node between two different time slices, which corresponds to a followed-by relationship in the corresponding serial pattern. Unnumbered arcs without any number indicated are normal arcs, and it indicates a co-occurrence relationship in the corresponding parallel pattern.

In this example, a DBN model has been shown that uses two time slices of representation, and the model is good for predicting possible event happenings in subsequent time window. In another embodiment, a DBN model can contain more than two time slices and, therefore, can be used to predict event happenings beyond the two slices of time window.

The temporal reasoning and cyber security prediction will now be described in further detail. The belief update may be performed by a standard reasoning algorithm. The inference process starts with setting the observed event states, either 'occurring' or 'not occurring', in the current time slice. The graphical structure and the probability parameters define the dependency relationship of the event occurrences between the current time slice and the next time slice. When the current event states are set, the inference algorithms applied to the DBN model can update the degree of belief within the next time slice. The higher posterior probability the higher chances of seeing the event in the next time window, given the observation of the current event occurrences. As time progresses, set of observed event occurrence can either be obtained from the cyber event repository, with a short delay, or from the real-time alerts generated by the deployed cyber security monitors. These observed events are fed into the DBN models followed by the update of the posterior beliefs using temporal reasoning engine.

Figure 7:
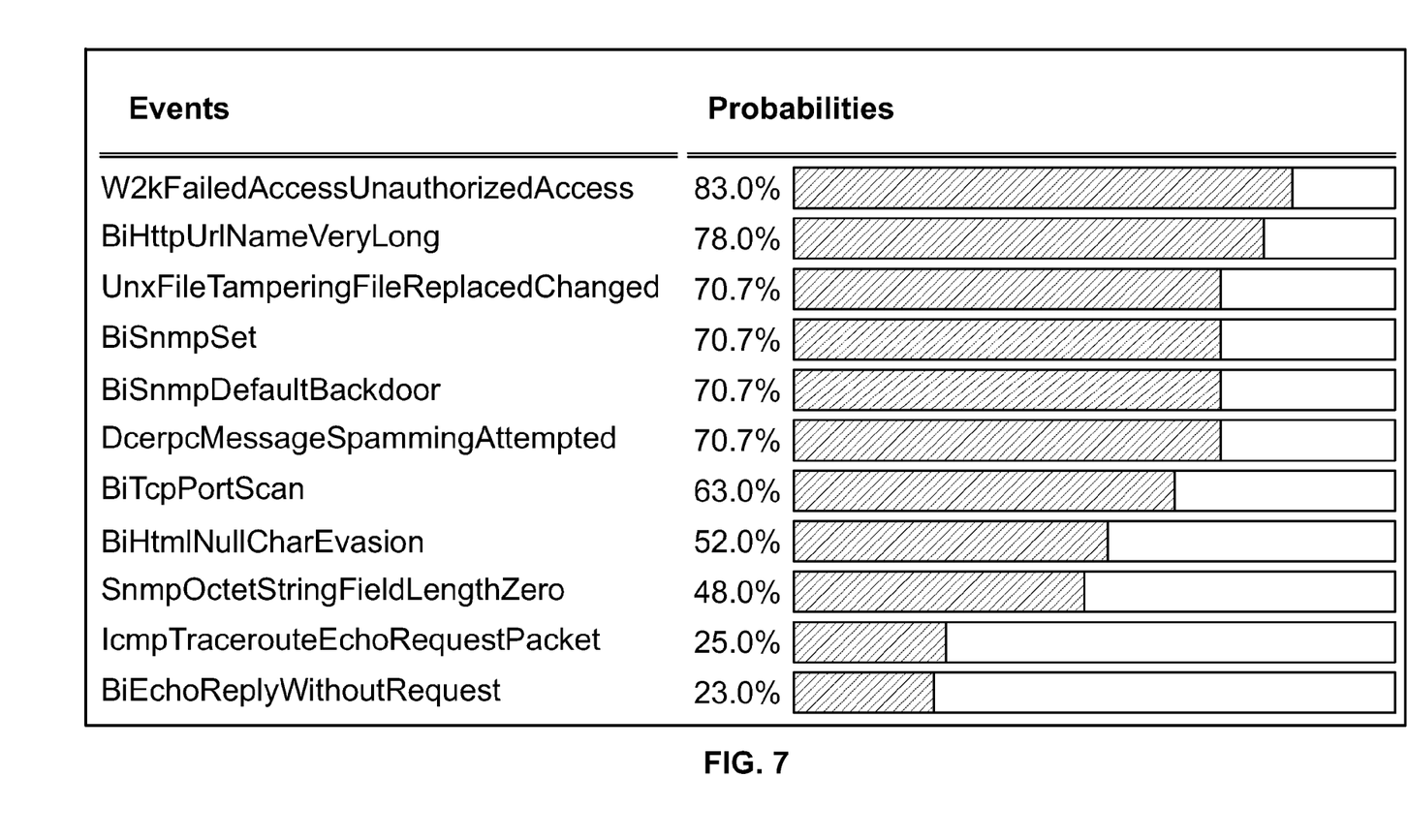
FIG. 7 shows an exemplar predicted cyber security event occurrence ordered by posterior probability.

The prediction results may be presented in HTML format as a web page as a web service so that the human analysts can access the results from anywhere and at anytime. FIG. 7 shows exemplar prediction results in an ordered table. The results are obtained based on the DBN model shown in FIG. 6.

The evolution of the prediction models used in the security tool will now be described in further detail. The cyber security problems and the attack techniques are dynamic. New attacks are emerging and new security patches are being developed to fix the security holes. Therefore, the cyber network security event dependencies may need to change over time. Obsolete event patterns may not be useful for prediction. As a result, the prediction models may be updated through periodic execution of pattern mining algorithms to discover the new patterns, and subsequent update of DBN model. The automation of the pattern mining and the DBN modeling make this evolution practical so that the prediction model can effectively function under ever-changing dynamic security environment.

The security tool of this disclosure takes advantage of sequential patterns of events discovered through temporal mining technology as a front-end processing. First, the patterns are mapped into a directed acyclic graph. Then, probabilities are derived from event dependency model built using the history of the sequential patterns. This enables prediction by means of the DBNs.

While the disclosure has been described with reference to exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims. It is therefore intended that the following appended claims and claims hereafter introduced are interpreted to include all such modifications, permutations, additions, and sub-combinations as are within their true spirit and scope.

The invention claimed is:

1. A method for predicting a sequence of cyber events comprising:
    collecting baseline cyber event patterns and storing the baseline cyber event patterns in a cyber event repository;
    searching the baseline cyber event patterns for sequential patterns and storing the sequential patterns in a pattern repository;
    translating the sequential patterns into a probabilistic graphical model;
    wherein the probabilistic graphical model is a Dynamic Bayesian Network prediction model; and
    using a temporal reasoning engine to feed the probabilistic graphical model with current cyber event sequences and predict future cyber events and the probability the future events will happen in a next time window.

2. The method of claim 1, wherein the baseline cyber events are collected by executing sequential cyber event mining algorithms.

3. The method of claim 1, wherein the predicted future cyber events are presented in HTML format as a web page.

4. The method of claim 1, wherein the sequential patterns are translated by associating each sequential pattern with statistic metrics.

5. The method of claim 4, wherein the statistic metrics are selected from the group comprising pattern support, pattern confidence and pattern coverage.

6. A computer program product embodied on a non-transitory computer readable medium and configured to execute by a microprocessor, the computer program product comprising a method for predicting a sequence of cyber events by computer instructions comprising:
    collecting baseline cyber event patterns and storing the baseline cyber event patterns in a cyber event repository;
    searching the baseline cyber event patterns for sequential patterns and storing the sequential patterns in a pattern repository;
    translating the sequential patterns into a probabilistic graphical model, wherein the probabilistic graphical model is a Dynamic Bayesian Network prediction model; and
    using a temporal reasoning engine to feed the probabilistic graphical model with current cyber events and predict future cyber events and the probability the future cyber events will happen in a next time window.

7. The computer program product of claim 6, wherein the baseline cyber events are collected by executing sequential event mining algorithms.

8. The computer program product of claim 6, wherein the predicted future cyber events are presented in a visual chart or list in a web page in a way that the cyber events are ordered descending by their posterior probabilities so that the most probable cyber events appears on the top of the visual chart or list.

9. The computer program product of claim 6, wherein the sequential patterns are translated by associating each sequential pattern with statistic metrics.

10. The computer program product of claim 9, wherein the statistic metrics are selected from the group comprising pattern support, pattern confidence and pattern coverage.

11. A network security system, comprising:
    a microprocessor configured to execute a computer program product embodied on a non-transitory computer readable medium, the computer program product comprising a method for predicting a sequence of cyber events by computer instructions comprising:
    collecting baseline cyber event patterns;
    searching the baseline cyber event patterns for sequential patterns;
    translating the sequential patterns into a probabilistic graphical model, wherein the probabilistic graphical model is a Dynamic Bayesian Network prediction model; and
    using a temporal reasoning engine to feed the probabilistic graphical model with current cyber events and predict future cyber events and the probability the future cyber events will happen in a next time window;
    a cyber event database storing a baseline cyber event pattern database in a cyber event repository; and
    a pattern repository storing a sequential pattern database.

12. The system of claim 11, wherein the computer instructions further comprise sequential event mining algorithms to collect the baseline cyber event patterns.

13. The system of claim 11, wherein the computer instructions further comprise statistic metrics to translate the sequential patterns.

* * * * *